United States Patent [19]

Puckette et al.

[11] 3,857,101

[45] Dec. 24, 1974

[54] VARIABLE BURST LENGTH WAVEFORM GENERATOR

[75] Inventors: Charles McD. Puckette; Walter J. Butler, both of Scotia, N.Y.

[73] Assignee: General Electric Company, Schenectady, N.Y.

[22] Filed: May 31, 1973

[21] Appl. No.: 365,513

Related U.S. Application Data

[62] Division of Ser. No. 319,352, Dec. 29, 1972, Pat. No. 3,774,167.

[52] U.S. Cl. .................... 328/72, 328/129, 307/215, 307/221 D

[51] Int. Cl. .................... Ho3k 3/78

[58] Field of Search .................... 328/48, 63, 72, 129; 307/215, 221 D

[56] References Cited

UNITED STATES PATENTS

| | | | |
|---|---|---|---|
| 3,539,926 | 11/1970 | Breikss | 328/48 X |
| 3,716,796 | 2/1973 | Harna | 328/63 |
| 3,732,355 | 5/1973 | Harna et al. | 328/63 X |
| 3,745,475 | 7/1973 | Turner | 328/48 X |
| 3,780,213 | 12/1973 | Harna | 328/63 |

*Primary Examiner*—John S. Heyman
*Attorney, Agent, or Firm*—Louis A. Moucha; Joseph T. Cohen; Jerome C. Squillaro

[57] ABSTRACT

A multi-state switch connected to DATA inputs of a counter, and NAND logic circuitry interconnected with the counter CLOCK and CLEAR inputs and CARRY output determine the number of clock pulses developed for a burst thereof occurring during the period of a lower repetition rate pulse signal applied to the counter and NAND circuit.

5 Claims, 4 Drawing Figures

CLOCK CONTROL LOGIC — OUTPUT OF NAND GATE 45

VARIABLE BURST LENGTH WAVEFORM GENERATOR

This is a division of application Ser. No. 319,352, filed Dec. 29, 1972, now U.S. Pat. No. 3,774,167.

Our invention relates to a logic circuit for controlling the operation of analog semiconductor charge-transfer memory systems, and in particular, to a clock control logic circuit which provides a programmable number of clock pulses for each burst thereof for the read-in of new analog information or recirculation of the stored analog information.

Although digital semiconductor memory devices and systems incorporating them have previously been extensively used, analog semiconductor memory devices and systems are relatively new. Analog memory systems, especially those having nondestructive read-out capability, have many applications such as in correlators, bandwidth reduction systems and time-shared communication channels. A specific example of the time-shared communication channel is a time-shared video communication channel wherein the video display at each subscriber's monitor must be refreshed at an appropriate rate with information stored at the monitor. This refresh operation occurs while the video channel is being used to transmit information to other subscribers in the network, thereby allowing each subscriber to have a continuous picture on his monitor during the time that he is not actually receiving new information from the video channel. For example, in a time-shared video communication channel system with 90 CRT display units in the network, each of which has a frame rate of 30 frames per second, each subscriber must wait three seconds before receiving a new frame of video information. During that three second interval, some means of refreshing the video information that is displayed on the monitor is required.

Analog memory units are fabricated of devices which may be most generally defined as being charge-transfer elements. Typical examples of charge-transfer devices are the charge-coupled device (CCD), the surface-charge transistor (SCT), and the bucket-brigade delay line. Examples of non-semiconductor analog memory devices are LC (i.e., lumped constant filters that approximate delay lines) and quartz delay line structures. The application of one or more bucket-brigade delay lines in an analog memory system having a nondestructive read-out capability is described and claimed in concurrently filed patent application S.N. 319,351, now U.S. Pat. No. 3,810,126 entitled "Recirculation Mode Analog Bucket-Brigade Memory System" having the same inventors and assignee as the present invention. Such patent is incorporated herein for purposes of providing the details of a bucket-brigade delay line embodiment of the analog memory unit component in an analog charge-transfer memory system.

The operation of the analog memory system, and in particular, the operation of the analog memory unit component thereof which utilizes charge-transfer devices, must be appropriately controlled as in the case of a digital memory system.

Therefore, one of the principal objects of our invention is to provide a clock control logic circuit for controlling the operation of an analog memory system having the memory unit thereof fabricated from charge-transfer type devices.

Another object of our invention is to provide a variable burst length waveform generator in the clock control logic circuit.

Briefly summarized, our invention is a logic circuit for controlling the operation of an analog memory system which has the memory unit thereof fabricated from charge-transfer type devices. The control logic circuitry determines the sequential operation of the analog memory system and includes a clock control logic, recirculation control logic and mode selector control logic. The clock control logic includes a clock generator for generating a continuous rectangular waveform voltage signal representing the clock pulses for operating the memory unit and circuitry for obtaining a continuous rectangular waveform voltage signal that has a programmable repetition rate which determines the period of the read-in and recirculation cycles. The clock control logic further includes binary counters, a multiposition switch and NAND gate circuitry for determining the number of clock pulses generated for each read-in or recirculate cycle to thereby form a variable burst length waveform generator.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character and wherein:

Figure 1:
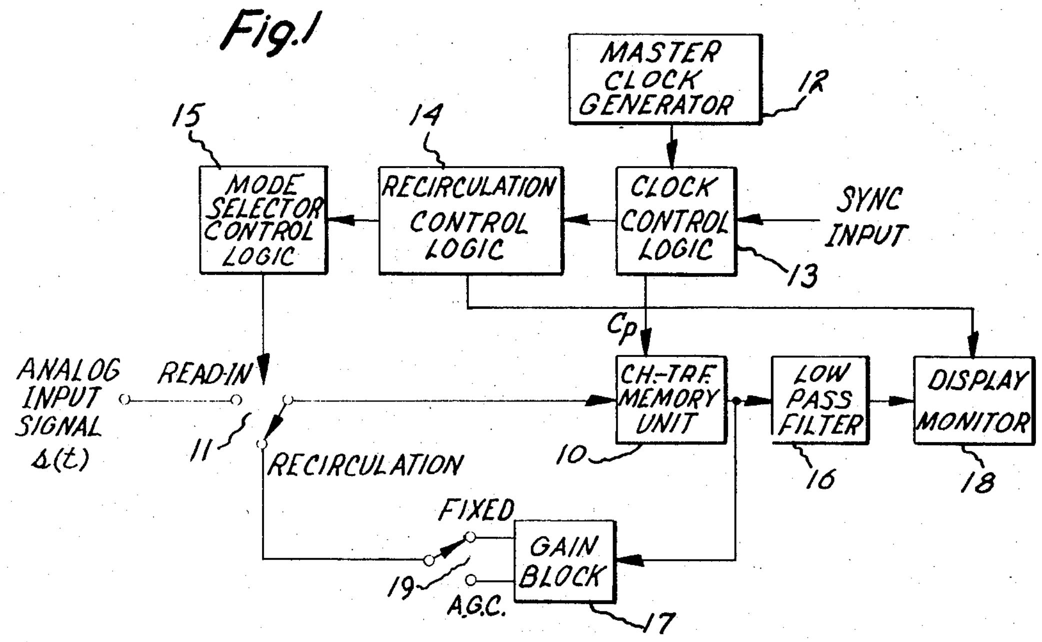
FIG. 1 is a general block diagram of our analog charge-transfer memory system including the control logic circuit.

Referring now to FIG. 1, there are shown in block diagram form the basic components of our analog charge-transfer memory system which may be selectively operable in a recirculation mode. The system includes a charge-transfer memory unit 10 having an input to which is selectively applied an analog input signal $s(t)$ representing particular analog information in a first position (or state) of mode selector switch 11 and which provides the memory recirculation mode of operation in a second state thereof. The charge-transfer memory unit 10 in one embodiment includes a bucket-brigade delay line consisting of N delay line stages fabricated from MOSFET transistors. The memory unit may also be fabricated from charge-coupled devices and surface-charge transistors as other examples of charge-transfer devices. However, for purposes of explaining a typical memory unit, the description herein will be limited to the bucket-brigade delay line (BBDL) memory unit fabricated from MOSFET transistors.

The bucket-brigade circuit, herein abbreviated to BBDL for bucket-brigade delay line, is variously described as a sampled-data circuit or a digitally controlled analog charge transfer circuit, but may be most simply described as an analog signal shift register. The bucket-brigade circuit thus provides a means for realizing an electronically variable delay line which has many uses in analog signal processing. The conventional bucket-brigade circuit may be generally described as a series array of capacitors interconnected by suitable electronic switches which, when implemented in monolithic form, may be transistors of any type such as bipolar or the field effect type MOSFET, JFET or MESFET. Information is stored as charge packets in such array of capacitors and is caused to be propagated through the array at a rate determined by the (clock) rate at which the switches are sequentially opened and closed. The bucket-brigade circuit, therefore, provides a noninductive means for implementing an analog delay line, the delay of which is controlled by an external clock, in single monolithic integrated circuit form.

The bucket-brigade stages are clocked from a conventional two-phase digital clock pulse generator 12, the output of which is controlled by a clock control logic circuit 13. The analog input signal $s(t)$ and a signal for synchronizing the clock control logic therewith may be supplied to our system on a single communication channel by time-multiplexing or may be supplied on separate channels. The clock control logic 13 determines the intervals in which the BBDL is clocked for read-in of the analog information signal, or for recirculation thereof, and also determines the intervals in which such information is stored (held) in the BBDL between the read-in and first recirculate cycle, and between any additional recirculations as will be described in detail with respect to FIG. 2 which shows the details of the clock control logic. A continuous rectangular wave voltage signal derived from the master clock generator 12 in the clock control logic has a repetition rate which determines the total period for each read-in and hold interval or recirculate and hold interval. This continuous rectangular wave signal is supplied to a recirculation control logic circuit 14 that determines the number of recirculations to be performed for each input analog information signal. The output of the recirculation control logic 14 is supplied to the mode selector control logic circuit 15 which controls the state of mode selector switch 11. The output of the charge-transfer memory unit 10 is connected to an input thereof in the recirculation mode state of switch 11 by means of a feedback path including a gain block component 17 which may be of the automatic gain control (A.G.C.) or fixed gain type as determined by switch 19. The output of the memory unit 10 is also connected to the input of a low pass filter network 16 which recovers the baseband signal. The output of filter 16 is connected to the input of a display monitor 18 which may be a conventional cathode ray tube or a television receiver in a time-shared video communication channel application of our invention. The operation of the display monitor is synchronized with the memory system operation by means of the signal generated in the recirculation control logic 14.

Our analog charge-transfer memory system operates in the following manner. Mode selector switch 11 is initially in its input signal read-in state whereby an analog input information signal is supplied to the input of the charge-transfer memory unit 10. At the same time, the control logic synchronizing signal supplied to clock control logic circuit 13 causes the logic therein to begin generating the continuous rectangular wave signal which determines the read-in, recirculate and hold periods. The read-in interval includes the generation of a first burst of the single phase, two-phase or multi-phase clock pulses $C_p$ of sufficient number to cause the analog input information signal to be read into the memory unit 10. In the case of the memory unit 10 being of the BBDL type, two-phase clock pulses $C_p$ and $\overline{C}_p$ are used. At the end of the first burst of clocking pulses, the sampled analog signal is held (stored) in the memory unit 10 for the "hold" interval established by the clock control logic. The "hold" interval may be as long as several hundred milliseconds. At the end of the "hold" interval, the recirculation control logic 14 can cause the state of the mode selector switch 11 to switch to the recirculate mode whereby the feedback circuit including gain block 17 is connected from the output of memory unit 10 to the input thereof. The start of the recirculation cycle results in the generation of a second burst of clock cycles of number equal to that in the first burst. The second burst of clock pulses causes the sampled analog information to be read out of memory unit 10 and recirculated through the feedback loop and reentered in the memory unit 10. At the end of the recircultion, the information signal is again stored in the memory unit for the "hold" interval. During the recirculation interval, the analog information is displayed on the monitor unit 18 as it is being read out of the memory unit. After completion of the recirculation cycle or cycles, the state of the mode selector switch 11 is switched to the read-in mode and the read-in and recirculate cycles are repeated for the next analog input information signal.

In the case of memory unit 10 being of the BBDL type fabricated from MOSFET transistors, the memory unit includes a driver stage for providing suitable interfacing (correct bias and buffering) between the analog input signal source and the BBDL connected to the output of the driver stage. The output of the BBDL, when a single BBDL is employed, is connected to a D.C. canceller circuit for rebiasing the BBDL output signal to its original value at the BBDL input for a given duty cycle. The rebiasing is necessary since the memory unit is operated in a gated clock-mode wherein information is read into the BBDL and stored therein for a particular "hold" time interval by effectively turning off the clock generator for such internal, and then the clock is again turned on for the recirculation cycle. The output of the BBDL is a delayed sampled-data signal waveform, i.e., a sampled and delayed version of the analog input signal $s(t)$. The analog input signal is sampled at a sufficiently rapid rate such that the envelope of the sampled-data signal at the memory unit 10 output faithfully follows the input signal waveform.

Figure 3A:
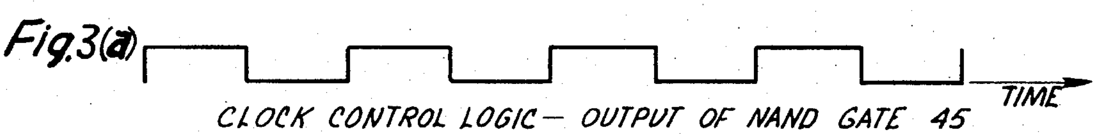
FIGS. 3*a*, *b* are voltge waveforms versus time appearing at various points in our variable burst length waveform generator circuit.
Figure 2:
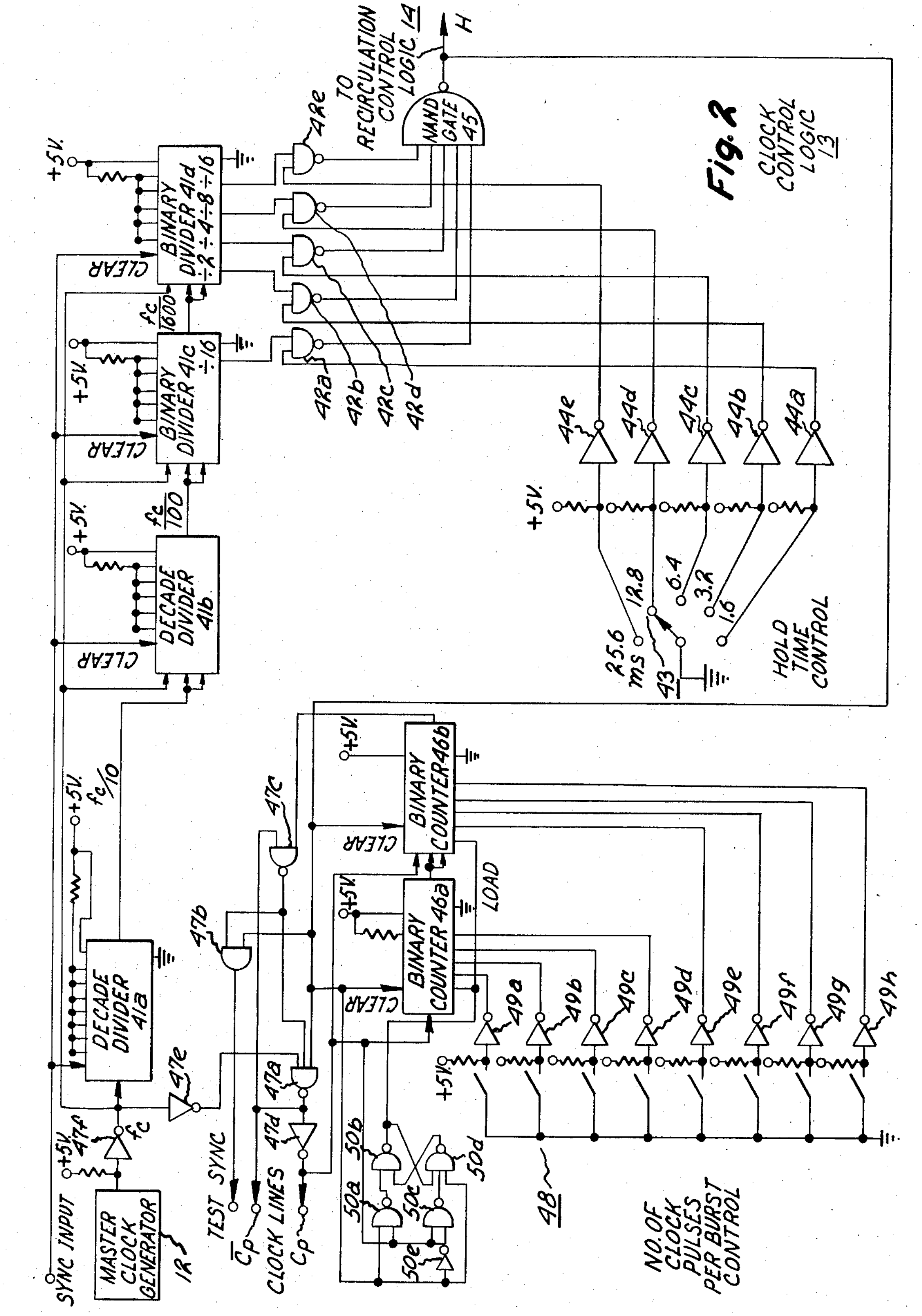
FIG. 2 is a schematic diagram of the clock control logic portion of the control logic circuit.

FIG. 2 illustrates the clock control logic circuit 13 which generates a continuous rectangular waveform voltage signal H that has a programmable repetition rate as determined by the selected state of "hold time" control switch 43. This repetition rate determines the period of the read-in and any recirculation($s$) cycles, and is also the input signal to the recirculation control logic. Waveform H is illustrated in FIG. 3($a$). The clock control logic also includes a variable burst length waveform generator that generates a programmable number of clock pulses in response to each rectangular wave H (i.e., a programmable number of clock pulses per burst thereof) as illustrated in FIG. 3($b$) for either reading-in new information into the charge-transfer memory unit 10 or for recirculating the stored information, and this variable burst length waveform generator is the subject of our present claimed invention. The burst of clock pulses are each generated at the positive-going edge of the H rectangular wave as shown in FIG. 3(*b*), or may be generated at the negative-going edge by other conventional logic means.

The clock control logic circuit includes a master clock generator 12 for generating a continuous wave of rectangular wave voltage pulses at the clock frequency (or more correctly the repetition rate) $f_c$ which as one typical example may be one megahertz (mHz). The master clock frequency is supplied to the "clock" inputs of two decade dividers 41*a* and 41*b* and two binary dividers 41*c* and 41*d* connected in series circuit relationship. The SYNC INPUT signal for synchronizing the bursts of clock pulses with the analog input signal $s(t)$ is applied to the "clear" input of dividers 41*a–d*. The synchronizing (SYNC INPUT) signal would generally be time-multiplexed with the analog input signal. The hereinabove-referenced parent U.S. Pat. No. 3,774,167 is hereby incorporated by reference for purposes of explaining the circuit details and circuit operation of the recirculation control logic and mode selector control logic, as well as of the circuitry in FIG. 2 included between dividers 41*a–d* and NAND gate 45, and which is not directly related to our present claimed invention.

The output of logic NAND gate 45 is also applied to the "clear" inputs of binary counters 46*a* and 46*b* as well as to the first inputs of logic NAND gate 47*a* and logic AND gate 74*b*. The (count-by-16) "carry" output of counter 46*a* is connected to the "enable" inputs of counter 46*b* and the (count-by-16) "carry" output thereof is connected to a first input of logic NAND gate 47*c*. The output of NAND gate 47*c* is connected to a second input of NAND gate 47*a* and to a second input of AND gate 47*b*. The output of NAND gate 47*a* is connected to the input of inverter 47*d* and to a second input of NAND gate 47*c*. The output of inverter 47*d* is connected to the "clock" inputs of counters 46*a* and 46*b*. The output of an inverter 47*f* which is connected to the "clock" input of dividers 41*a–d* is also connected through a second inverter 47*e* to a third input of NAND gate 47*a*. The output of inverter 47*d* provides the (single-phase) clock pulses to the memory unit 10 on the clock line $C_p$. In the case of the memory unit 10 incorporating a BBDL, two-phase clock pulse are required and the output of NAND gate 47*a* provides the complementary clock pulses $\overline{C}_p$. The addition of simple logic to the $C_p$ and $\overline{C}_p$ clock lines readily converts the circuit to three-phase or four-phase clock lines when required by the particular memory unit 10 employed. The output of AND gate 47*b* supplies a pulse synchronized with the beginning of each burst of clock pulses and may be used for test purposes. The circuit defined by gates 47*a–e* operates in the following manner:

When the ouptut of NAND gate 45 goes from low to high, NAND gate 47*a* is enabled thereby allowing clock pulses of frequency $f_c$ to be fed to clock line $\overline{C}_p$ and, by means of inverter 47*d*, to clock line $C_p$. Since the output of NAND gate 50*b* is at a low state as the result of the output of NAND gate 45 having been low, the "load" inputs of binary counters 46*a* and *b* are enabled thereby allowing the logic states of the flip-flops comprising these counters to be set to the logic states present at the outputs of inverters 49*a–h*. The outputs of inverters 49*a–h*, which are connected to the "data" inputs of counters 46*a* and *b*, are controlled by switch 48, in a manner similar to the operation of the "hold time" control circuit of switch 43 and inverters 44*a–e* associated therewith, with the exception that switch 48 may have more than one closed state among its eight positions to thereby achieve a greater selection of the number of clock pulses per burst. NAND gates 50*a–d* comprise a conventional type D flip-flop whose purpose is to provide a time delay of $1/f_c$ before the high state of NAND gate 45 is applied to the "load" inputs of the aforesaid binary counters since such counters require a clock pulse while the "load" input is low in order to set the flip-flop in the desired manner that has been previously described.

During the second half of the first clock cycle, the output of NAND gate 50*b* is switched to a high state by means of the clock applied to first inputs of NAND gates 50*a* and 50*c* together with the output of NAND gate 45 applied to a second input of NAND gate 50*a* and such output, applied through inverter 50*e*, to second input of NAND gate 50*c*. The "load" inputs of binary counters 46*a* and *b* are inhibitied in the high state so that the aforesaid counters being to count the clock pulses that are passed to the clock lines.

The number of clock pulses allowed to pass to the clock lines is determined by the difference between the number that is initially stored in counters 46*a* and *b* by the "load" sequence just described, and the maximum count that the counters can attain, 256. For example, if a 248 pulse burst is desired, the decimal number 8 (256–248 = 8) is entered in binary form onto switches 48. During the first clock cycle of the burst, this binary number is entered into counters 46*a* and *b* as the initial state of the aforesaid counters and the counters begin counting from this number. 248 clock pulses may therefore occur before the aforesaid counters reach their maximum count of 256 at which the "carry" output of counter 46*b* output goes high. During the portion of the clock cycle that inverter 47*c* is low, the output of NAND gate 47*a* will be high and this, combined with the high state of the "carry" output of counter 46*b* will force the output of NAND gate 47*c* low, thereby inhibiting NAND gate 47*a* , and terminating the clock burst.

The clock burst control logic is re-set in preparation for the next burst by the output of NAND gate 45 going to its low state which sets counters 46*a* and *b* to a binary equivalent of zero, causes the output of NAND gate 50*b* to go to zero, and inhibits NAND gate 47*a*. The output of NAND gate 47*c* goes to its high state as a result of re-setting binary counters 46*a* and 46*b*, and remains high until the next time that a "carry" output is received from counter 46*b*.

As stated hereinabove, the "hold" time control circuit which includes switch 43, inverters 44*a–e*, NAND gates 42*a–e* and 45 and the outputs of binary dividers 41*c*, 41*d* provides a programmable continuous rectangular waveform signal H of fixed repetition rate which determines the fixed period of each "read-in" and subsequent "hold" (information storage period) cycle or "recirculation" and subsequent "hold" cycle. The second control circuit which includes mechanical (or electronic) switch 48, the plurality of positively biased inverters 49*a, b, c, d, e, f, g* and *h* and binary counters 46*a* and *b* provides a programmable number of clock pulses (at the master clock frequency) for each burst thereof to be applied to clock line $C_p$ (and $\overline{C}_p$ in a two phase system for clocking the BBDL(*s*)) during each period of the H signal. The clock burst control switch 48 thus provides the control for a variable burst waveform generator which is the subject of our present claimed invention and which is comprised of elements 46*a*, *b*, 47 *a–e*, 48, 49 and 50 *a–d*. The advantages of the variable burst waveform generator are that in controlling the number of clock pulses per burst, (1) the sampled analog information signal can be positioned in a specific location of the memory unit (i.e., the analog signal may be 20 samples in a 100 stage BBDL), (2) it can sequence in more than one analog signal when the memory unit stages are much greater in number than the samples in one signal, and (3) the analog memory system can have a variable memory size unit.

The bursts of clock pulses impressed on the clock lines $C_p$ and $\overline{C}_p$ in the FIG. 2 clock control logic circuit are of positive polarity voltage. The clock pulses are translated to negative polarity prior to being applied to the BBDL(*s*) by means of a conventional MOSFET gate driver circuit (not shown). As stated above, the relationship of bursts of clock pulses to the continuous rectangular wave signal H at the output of NAND gate 45 which determines the period of each read-in or recirculation cycle including the hold period is illustrated in FIG. 3(*b*) referenced with respect to FIG. 3(*a*).

As a result of the specific embodiment of the clock control logic illustrated in FIG. 2 and recirculation control logic 14, each cycle of operation for read-in or recirculation can be selected to have one of five fixed periods between 1.6 and 25.8 milliseconds by means of "hold time" control switch 43, the number of clock pulses per burst can be controlled over a range from 2 to 256 by means of switch 48, and the number of recirculations can be selected in a particular range. The "hold time" control switch 43 would be utilized where versatility in the periods between refreshing of the display monitor is required. The particular combination of "hold time" control selected by switch 43 and the number of recirculations would depend upon the particular application of our system.

The particular counters described herein are of the model number 74161 manufactured by Texas Instruments, Inc. All of the other logic gates are of compatible types.

From the foregoing, it can be appreciated that the objectives set forth have been met in that our invention provides a clock control logic circuit in the form of a variable burst length waveform generator for controlling the operation of an analog charge-transfer memory system, as defined by the following claims.

What we claim as new and desire to secure by Letters Patent of the United States is:

1. A variable burst length waveform generator programmable as to the number of pulses in each burst and comprising at least one counter having a CLEAR input, CLOCK input, DATA inputs and a CARRY output, said CLEAR input connected to a first source of continuous rectangular waveform voltage signals having a particular repetition rate, a multi-state switch device having a plurality of outputs connected to the DATA inputs of said counter, said switch device having means for selecting the state thereof so as to selectively provide at least one of the DATA inputs of said counter with a high state input characterized by a high voltage condition, and first logic NAND gate circuit means for gating on and off rectangular waveform voltage signals supplied from a second source of continuous rectangular waveform voltage signals to form bursts thereof, said first logic NAND gate circuit means having a first input connected to the first source of continuous rectangular waveform voltage signals, a second input connected to the CARRY output of said counter, and a third input connected to the second source of continuous rectangular waveform voltage signals having a fixed repetition rate greater than the repetition rate of the first source signals, output of said first logic NAND gate circuit means connected to the CLOCK input of said counter and also providing the bursts of the second source rectangular waveform voltage signals wherein the number of pulses in each burst is determined by the high state DATA input to said counter to thereby provide a burst waveform generator having a variable burst length output which is programmable as to the number of pulses in each burst for fixed repetition rates of the voltage signals supplied from the first and second signal sources by means of selection of the state of said switch device alone.

2. The variable burst length generator set forth in claim 1 wherein said multi-state switch device is a multi-position mechanical switch having an input connected to ground and the outputs connected to inputs of first inverters having outputs connected to the DATA inputs of said counter, each inverter input also connected to a source of positive polarity voltage, the closure of the switch in at least one of the positions thereby providing a high state output of the associated at least one inverter which is applied to the DATA input of said counter.

3. The variable burst length generator set forth in claim 2 wherein said first logic NAND gate circuit means comprises a first logic NAND gate having a first input connected to the CARRY output of said counter, a second logic NAND gate having a first input connected to an output of said first gate, a second input connected to the first source of continuous rectangular waveform voltage signals, and a third input connected to the second source of continuous rectangular waveform voltage signals, output of said second gate connected to a second input of said first gate, a second inverter having an input connected to an output of said second gate, output of said inverter connected to the CLOCK input of said counter, output of said inverter also providing the bursts of the second source rectangular waveform voltage signals.

4. The variable burst length generator set forth in claim 3 and further comprising second logic NAND gate circuit means for providing a time delay of one period of the second source rectangular waveform voltage signal in order to set said counter to the state established by said switch and having a first input connected to the first source of continuous rectangular waveform voltage signals and a second input connected to an output of said second inverter, output of said second logic NAND gate circuit means connected to a LOAD input of said counter.

5. The variable burst length generator set forth in claim 4 wherein said second logic NAND gate circuit means comprises a third logic NAND gate having a first input connected to the first source of continuous rectangular waveform voltage signals and a second input connected to the output of said second inverter, a fourth logic NAND gate having a first input connected to an output of said third NAND gate, output of said fourth NAND gate connected to the LOAD input of said counter, a fifth logic NAND gate having a first input connected to an output of said fourth NAND gate and having a second input connected to the first source of continuous rectangular waveform voltage signals, output of said fifth NAND gate connected to a second input of said fourth NAND gate, a third inverter having an input connected to the first source of continuous rectangular waveform voltage signals, a sixth logic NAND gate having a first input connected to an output of said third inverter and having a second input connected to the output of said second inverter, output of said sixth NAND gate connected to a third input of said fifth NAND gate.

* * * * *